United States Patent [19]
Higgins et al.

[11] Patent Number: 5,754,671
[45] Date of Patent: May 19, 1998

[54] METHOD FOR IMPROVING CURSIVE ADDRESS RECOGNITION IN MAIL PIECES USING ADAPTIVE DATA BASE MANAGEMENT

[75] Inventors: Joseph T. Higgins, Owego, N.Y.; Timothy J. Schaewe, Binghamton, N.Y.

[73] Assignee: Lockheed Martin Corporation, Bethesda, Md.

[21] Appl. No.: 421,579

[22] Filed: Apr. 12, 1995

[51] Int. Cl.⁶ .................................................. G06K 9/00
[52] U.S. Cl. ............................... 382/101; 382/186
[58] Field of Search .................... 382/101, 102, 382/159, 161, 186, 229; 395/602, 603, 607, 760

[56] References Cited

U.S. PATENT DOCUMENTS

| | | | |
|---|---|---|---|
| 4,979,227 | 12/1990 | Mittelbach et al. | 382/40 |
| 5,050,218 | 9/1991 | Ikeda et al. | 382/1 |
| 5,371,807 | 12/1994 | Register et al. | 382/14 |
| 5,515,455 | 5/1996 | Govindaraju et al. | 382/186 |

FOREIGN PATENT DOCUMENTS

| | | | |
|---|---|---|---|
| 63-68989 | 3/1988 | Japan | 382/229 |
| 4-111186 | 4/1992 | Japan | 382/101 |
| 5-242303 | 9/1993 | Japan | 382/101 |

OTHER PUBLICATIONS

English Translation of Japanese No. 4–111186, Isoyama, Apr. 1992.

English Translation of Japanese No. 5–242303, Egami, Sep. 1993.

English Translation of Japanese No. 63–68989, Uchida et al., Mar. 1988.

*Primary Examiner*—Andrew Johns
*Attorney, Agent, or Firm*—William H. Steinberg Mark A. Wurm

[57] ABSTRACT

A method of cursive address recognition of mail pieces using adaptive dictionary management is provided which includes creating a plurality of word databases containing the most frequently observed words in a particular portion of an address block derived from training data. Word images from various portions of the address block are extracted and the word images are compared to the database corresponding to the appropriate portion of the address block using a cursive word recognition engine. The search order of the word databases are updated based on the frequency of occurrence of recognized words in a predetermined number of previously evaluated addresses.

8 Claims, 13 Drawing Sheets

METHOD FOR IMPROVING CURSIVE ADDRESS RECOGNITION IN MAIL PIECES USING ADAPTIVE DATA BASE MANAGEMENT

CROSS REFERENCE TO RELATED APPLICATIONS

The present application is related to Ser. No. 08/421,597 entitled "Method for Exploiting Correlated Mail Streams Using Optical Character Recognition", assigned to the same assignee as the present invention.

BACKGROUND OF THE INVENTION

The present invention relates to automatic mail processing and more particularly to a method of exploiting mail stream statistics to improve cursive word recognition.

In the United States a large and always growing volume of mail is processed on a daily basis. Although recent hardware and software advances have been made in optical character recognition (OCR) and these advances have improved overall mail throughput, further improvements are desirable in attempting to achieve the economic benefits that would flow from a complete and fully automated bar-coding system.

In conventional OCR methods for processing letter mail and assigning a bar code, an address block location must first be found. Next, the address is processed by a segmentation function whose ultimate goal is to separate each line into individual characters or in the case of hand written script identifying words. The recognition process then attempts to identify each pertinent character or word in the case of script. If a zip code is read incorrectly and cannot be verified with a database search, a bar code cannot be assigned and manual processing is typically required. At the present time no attempt is made to recognize cursive written words in addresses. If an assignment is made it is made only as a result of recognizing the numerical information of the zip code. Experimental cursive address recognition systems have been demonstrated however the time required to perform word recognition is prohibitive. A practical word recognition process would not only allow verification of the zip codes included on the mail piece but also enable 9 or 11 digit zip codes to be assigned.

It is an object of the present invention to provide a automated mail processing method which reduces the amount of mail which must be manually processed.

It is another object of the present invention to provide an automated mail processing method which takes advantage of the statistics of the mail stream being processed to improve cursive word recognition.

It is still another object of the present invention to provide a method of cursive word recognition which operates with sufficient throughput to allow it to be part of existing US Postal Service off-line address recognition system.

SUMMARY OF THE INVENTION

In one aspect of the present invention a method of cursive address recognition of mail pieces using adaptive dictionary management is provided which includes creating a plurality of word databases containing the most frequently observed words in a particular portion of an address block derived from training data. Word images from various portions of the address block are extracted and the word images are compared to the database corresponding to the appropriate portion of the address block using a cursive word recognition engine. The search order of the word databases are updated based on recognized words from previously evaluated addresses.

In another aspect of the present invention a method of efficiently performing cursive address recognition on mail pieces is provided which includes determining address block location. The print style of the mail piece address is determined to identify hand written cursive address words. A zip code is located and recognized using character based recognition techniques. City and state words are located and recognized using cursive word recognition techniques. Cursive address recognition is continued only if correlation between city and state words, and the zip codes exceeds a predetermined number and confidence of each of the words and numbers also exceeds a predetermined number.

DETAILED DESCRIPTION OF THE INVENTION

Figure 1:
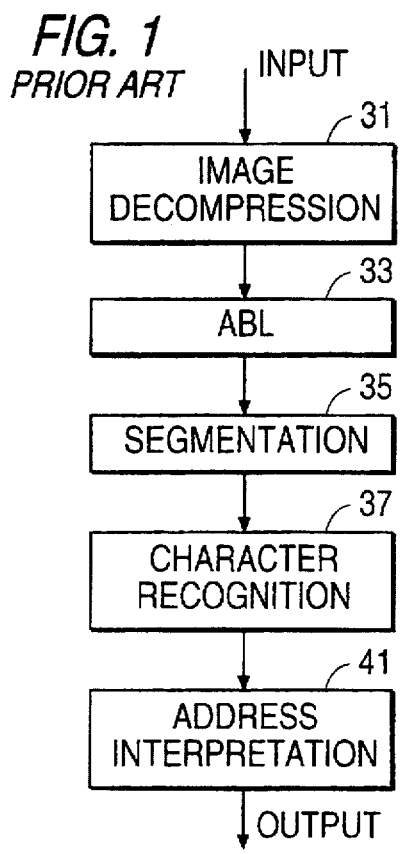
FIG. 1 is a high level flow chart of prior art OCR process.

Before describing the improvements made by use of adaptive OCR, a Remote Computer Reader (RCR) prototype system which is used to process envelope images which are rejected by the current state-of-the-art postal technology will first be described. Referring now to the drawing where like numerals indicate like elements throughout and more particularly FIG. 1 thereof, a flow diagram of the steps involved in processing an image using an RCR system is shown.

After an initial decompression stage at step 31, the image is processed sequentially by an address block location function at step 33, character segmentation function at step 35, recognition and address interpretation functions at steps 37 and 41, respectively.

Since the incoming image to step 31 is compressed, a decompression process must be performed on the image. The compression algorithm is based on the CCITT recommendation for the transmission of documents by facsimile. This algorithm uses a modified Huffman code to one-dimensionally compress every fourth (k=4) line. The other lines are two-dimensionally compressed based on the previous one-dimensionally compressed line.

The next step 33 in the process is to find the destination Address Block Location (ABL). ABL is a complex and time consuming step because there are so many different things that appear on envelopes. For example, the return address block, stamp and advertising logos can all look like a possible ABL candidate.

Figure 2:
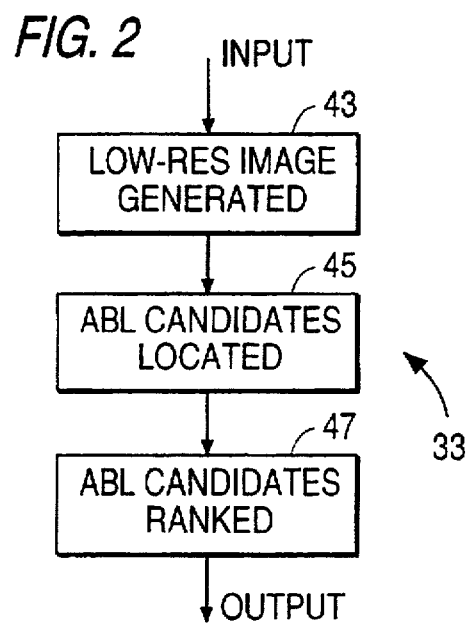
FIG. 2 is a flow chart of the ABL process of FIG. 1 shown in more detail.

Referring now to FIG. 2, the Address Block Location function in step 33 of FIG. 1 is shown in more detail. The input to ABL is the full resolution image from which a low resolution image is created at step 43. The low-resolution image is used to determine possible destination ABLs in step 45. These candidate address blocks (CABs) are then classified as either hand, indicating hand written characters, or machine, indicating machine created characters and then ranked in step 47.

Figure 3:
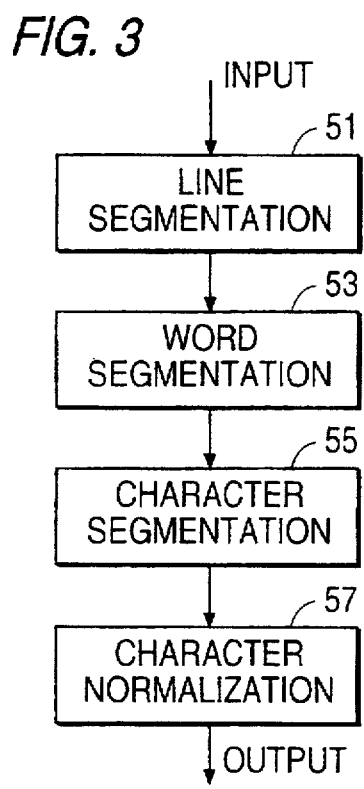
FIG. 3 is a flow chart of the segmentation process of FIG. 1 shown in more detail.

The top three hand and machine CABs are then passed on to the segmentation process, shown in step 35 in FIG. 1 and in more detail in FIG. 3. The input to the segmentation step is the highest ranked candidate from either the machine or hand list depending on whether the envelope is believed to have a machine or hand written address. In step 51 the coordinates of the individual lines are determined. In step 53 the word breaks are determined. The line and word segmentation information from steps 51 and 53 is then used to segment and normalize each character in steps 55 and 57, respectively. The output of segmentation is a list of normalized characters for a maximum of 4 lines with 40 possible characters on each line.

Figure 4:
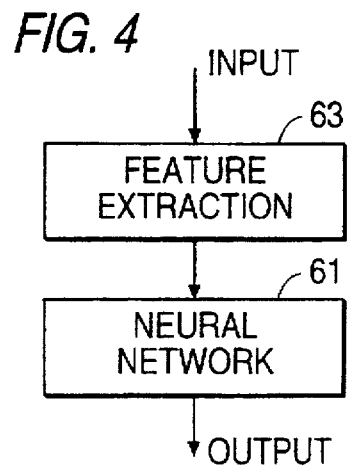
FIG. 4 is flow chart of the character recognition process of FIG. 1 shown in more detail.

The character recognition function in step 37 of FIG. 1 and shown in more detail in FIG. 4 is responsible for determining the actual characters for the list of normalized character images generated in segmentation. As shown in FIG. 4, character recognition is accomplished using a neural network 61 whose input is a set of features that are extracted from the normalized characters in step 63. The output of the character recognition function is a list of the top three upper case, lower case and numeric choices for each of the normalized characters.

Thus, for each normalized character image, the character recognition process produces 9 choices plus their respective confidence values. Confidence values a a distance measure from the ideal that ranges from 1–255, with 1 being the highest confidence.

The list of characters and respective confidences is now sent to the final step of the process shown at 41 in FIG. 1, address interpretation. In this step one of two things can happen, either a valid zip code will be assigned, or the image will be rejected.

In determining the correct zip code it is important to note that the quality of the address interpretation depends on the success of the previous steps. Without the correct ABL, good segmentation and reasonable character recognition, there is little hope of finding the correct zip.

In order for the correct zip to be found, the following conditions have to be met. The correct candidate ABL has to be used. The number of characters in the word containing the zip has to clearly indicate that this word contains the zip code. That is, segmentation must recognize the word breaks around the zip code, which is quite difficult for hand images due to inconsistencies in handwriting. The characters have to be segmented correctly. Errors in character segmentation such as splitting a character into two separate characters or combining two characters as one, preclude the possibility of good character recognition and, hence, address interpretation. Character recognition must produce the correct character. The confidence of the correct characters have to be good. This is not as important as having the correct character recognized, but it does allow more decisions on zip codes to be finalized.

Figure 5:
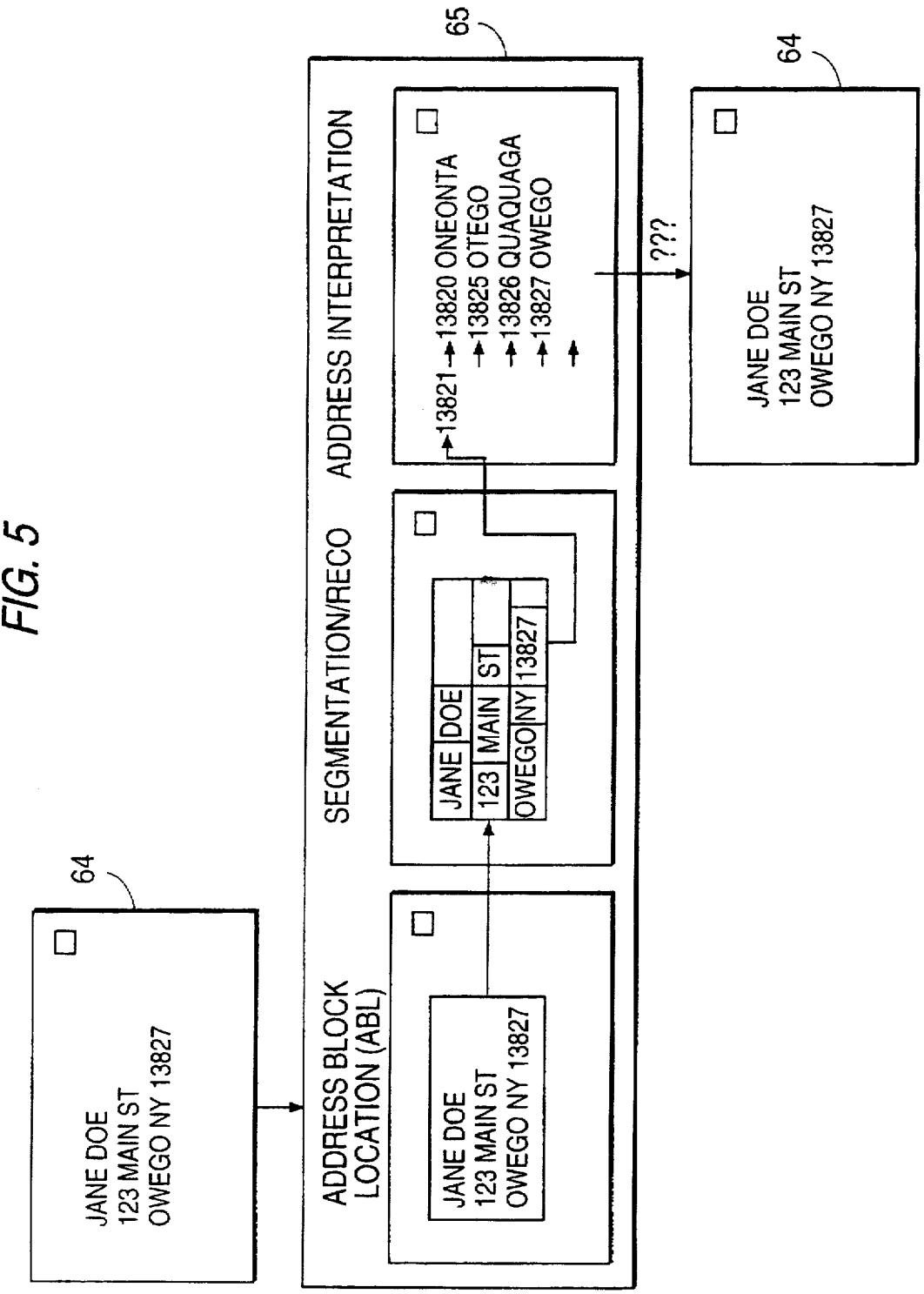
FIG. 5 illustrates an image passed through prior art optical recognition process.

An example of an image 64 passed through this conventional process of address block location segmentations, character recognition and address interpretation indicated by reference number 65 is shown in FIG. 5. In this illustrative example, a case where the address interpretation process could not make a determination due to the inaccurately recognized digit (13821 versus 13827).

Since 13821 is not a valid zip code, as can be verified with a database search, a bar code will not be assigned and so manual processing is required. It will be shown, hereinafter, how adaptive signal processing, in accordance with the present invention, was successfully applied to this problem.

In this example, the zip code has been recognized incorrectly and so the database search does not yield an exact match. Rather than assigning a potentially incorrect bar code, the letter is not assigned, i.e., no bar code is printed on the front of the envelope.

While the conventional OCR process treats each image independently, adaptive OCR, in accordance with the present invention, attempts to exploit any statistical characteristics of the mail stream. If one could gather real-time statistics on the mail stream, it seems plausible that this data could be exploited to achieve higher recognition rates.

Figure 6:
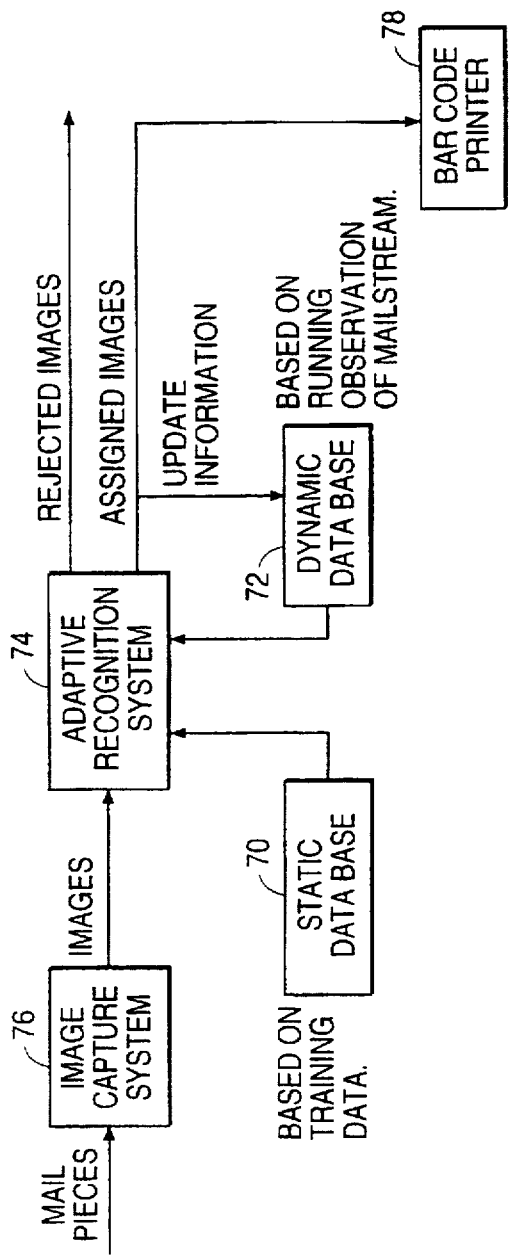
FIG. 6 is a flow diagram showing static and dynamic information combined to exploit correlations among mail pieces in an adaptive process in accordance with the present invention.

The adaptive OCR process in accordance with the present invention is shown in FIG. 6. A static database 70 is used to store data based on training. Real time data for the parameters of interest, such as address block location, zip code, city, state, and font size or type is collected from the mail processing equipment in order to generate a dynamic database 72 having statistical information. An image capture system 76 which includes a scanner, buffer, and image compressor, can be used to generate images from the mail pieces in the mail stream and provide compressed images to an adaptive recognition system 74. The adaptive recognition system can be implemented on a computer system such as an IBM RISC System/6000 or Pentium based personal computer. One way to associate the images from the image capture system with the mail piece it was obtained from is to provide a bar code on the back of the mail piece associated with the scanned image. After the image has been analyzed and the zip code associated with the image determined, the bar code associated with the zip code can be placed on the front of the mail piece which has the bar code on the back of the mail piece which is associated with the image that was analyzed. The mail pieces that were scanned after an appropriate delay can be sent to a bar code reader which reads the bar code on the back of the envelope. Then a bar code which corresponds to the zip code having been identified with the image can be printed on the front of the mail piece.

The dynamic database 72 can include probability density functions, correlations statistics, mean, variance, and higher order moments. The statistical parameters are tracked using recursive least squares schemes with various windowing options, as well as moving average linear filters. Based on cost models which indicate the cost of making various types of errors in the OCR process, a decision threshold is determined which is based on the real-time statistics of the mail stream by the adaptive recognition system 74. The decision threshold determines the confidence value required by the adaptive process in order to assign previously rejected mail pieces based solely on correlation statistics. The decision threshold will adapt to the statistics of the mail stream and is not a constant value. Assigned images from the adaptive recognition system provide the information needed to update the dynamic database and can be used to provide bar code information on the mail pieces by a bar code printer 78 to allow for sorting. Previously unassigned characters are assigned according to the decision threshold determination and assignment processes. Assignment processes include weighting filters coupled with linear/nonlinear thresholding, database pruning routines and nonlinear filtering techniques.

Figure 7:
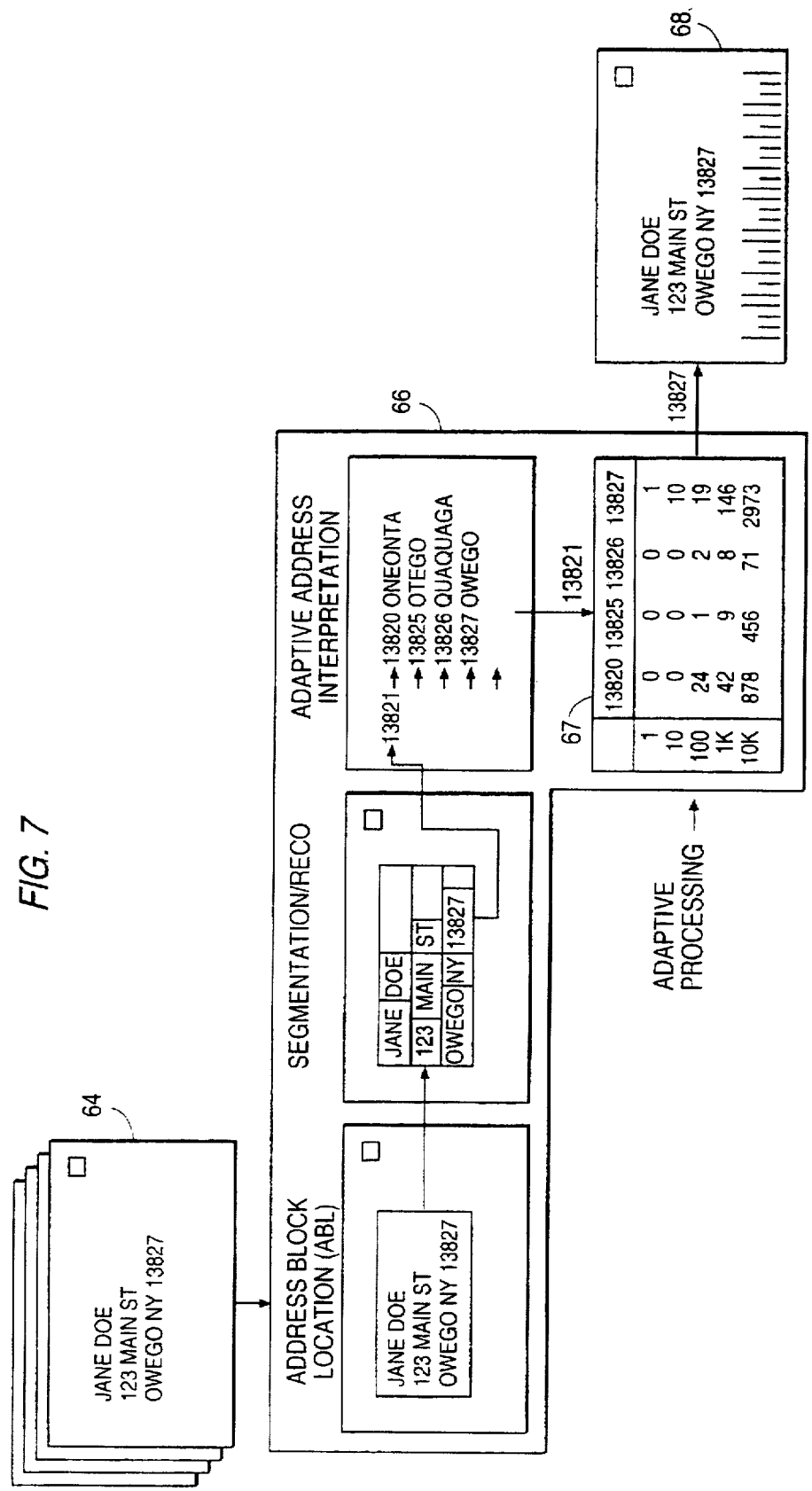
FIG. 7 illustrates an image passed through a process exploiting statistical zip code information using adaptive weighting in accordance with the present invention.

A specific example of adaptive OCR is shown in FIG. 7. Referring now to FIG. 7, a process of address block location segmentations, character recognition and address interpretation indicated by reference number 66 which includes a zip code hit-table 67 that tabulates the number of times a particular zip code has been recognized over a certain period of time (e.g., the zip code 13820 was recognized 24 times within the previous 100 mail pieces). The implementation of the zip code hit table is preferably done using a lookup table whose index is the valid range of 5 digit zips, 0-99999, that contains the number of occurrences of the zip corresponding to that index in the last M images processed. The length of the history list will be M. The zip code hit table is then updated for each image processed as follows. The index corresponds to the assigned 5 digit zip code is increased by one if the confidence of that zip is greater than some threshold, otherwise it is not increased. At the same time the index corresponding to the zip code from the history file which occurred M images previously is decreased by one. The history file is then updated so that it contains the zip code for the image just assigned.

By exploiting the data in the zip code hit-table, simple weighting filters can be used to make a better estimate of ambiguous zip codes such as 13821. While this method will certainly not guarantee accurate results on a per-letter basis, it is statistically reasonable to assume that the average performance of the system will improve.

After investigating various mail streams at General Mail Facilities (GMFs), it became apparent that zip code and address block location were two parameters which have significant statistical characteristics which can be exploited.

Existing United States Postal Service images from Remote Computer Reader (RCR) field test were exploited. The RCR unit is an off-line mail processor which is meant to handle reject mail from existing automation equipment. These images and their associated truth data were extracted from processing centers in Florida and New Jersey. Note that reject mail is mail which could not be processed by the current multi-line optical character recognition (MLOCR) technology which United States Postal Service has in its inventory.

Images from the two GMFs were analyzed to determine the statistical characteristics of each digit of the actual 5-digit zip codes. Although the true zip codes were used to gather statistics, the RCR-estimate would yield nearly identical results since the error rate is extremely low.

Figure 8:
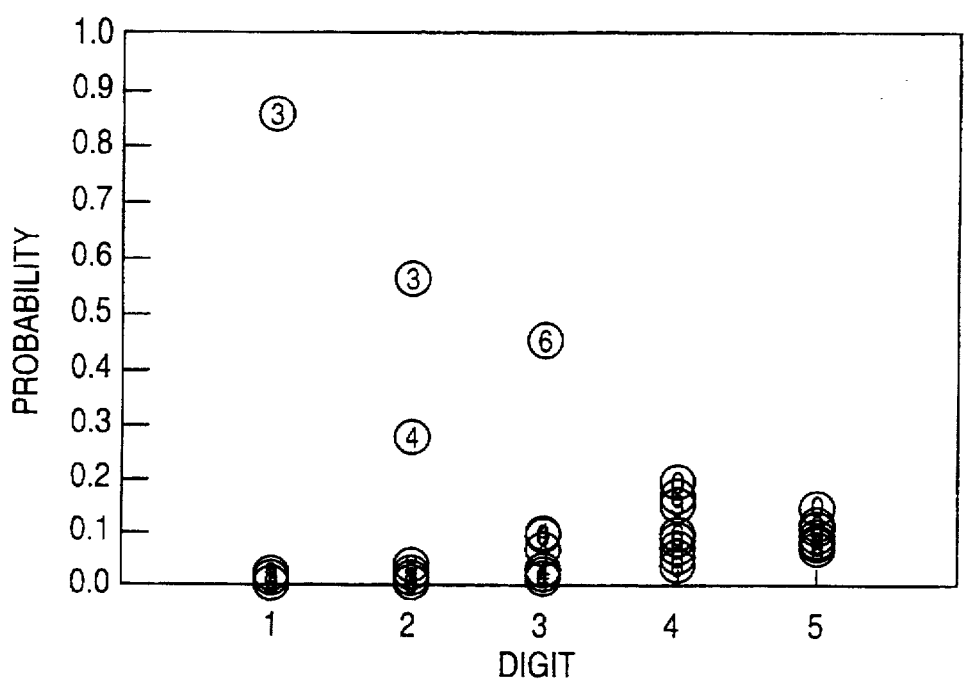
FIGS. 8 and 9 are graphs with the digit positions of the five digits of the zip codes sequentially positioned along the abscissa and probability along the ordinate, of the unconditional probability of each of the numbers 0–9 being in a particular digit position in the various zip codes of the images analyzed in the Florida General Mail Facility for handwritten and machine created mail pieces, respectively. The graphs are based on 7,375 images with 585 being unresolvable in case of FIG. 8 and 4,109 images with 431 being unresolvable in the case of FIG. 9.
Figure 9:
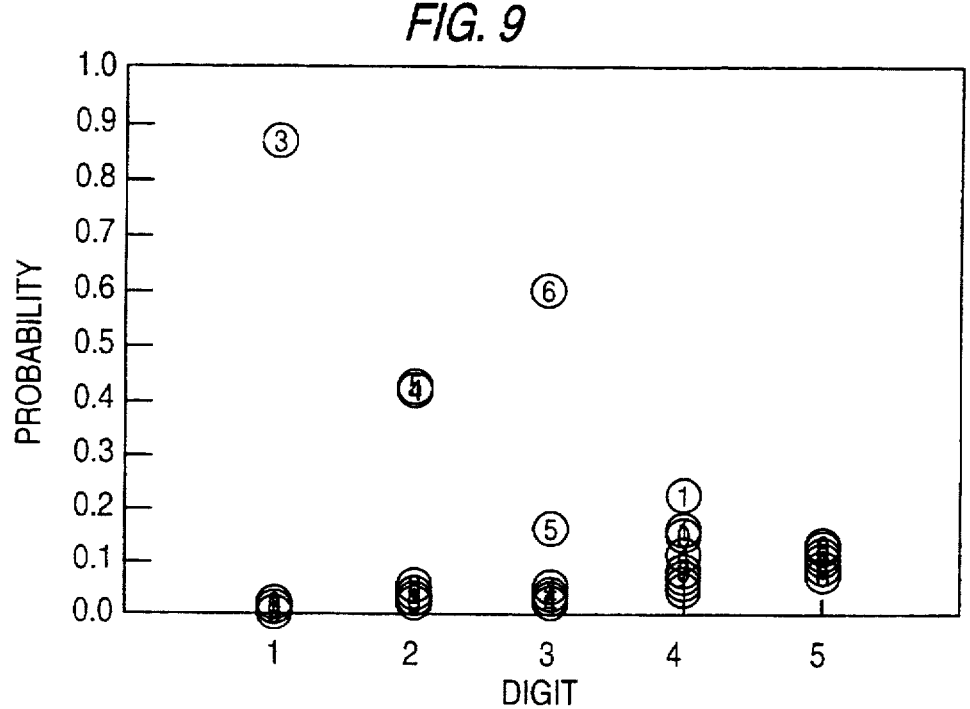

Unconditional probability distributions from these analyses are shown in FIG. 8 and FIG. 9, which show the probability of a particular number (0–9) occurring in each of the 5 digits of the zip code for handwritten and machine created mail pieces, respectively.

As shown in FIGS. 8 and 9, the first three positions do indeed have numbers with a high probability of occurrence. For example, the data shows that the probability of a "3" occurring in the first position of a zip in the Florida GMF was 90%. In fact, joint statistics on the first three digits of any 5-digit zip in either GMF also showed highly skewed distributions. Also, as expected the occurrence probability of the last two digits is about 10% indicating that they are uniformly distributed.

The data from the Florida GMF clearly shows that the first few digits of the zip codes are highly skewed towards the local area, regardless of whether it is a machine or handwritten mail piece.

Figure 12:
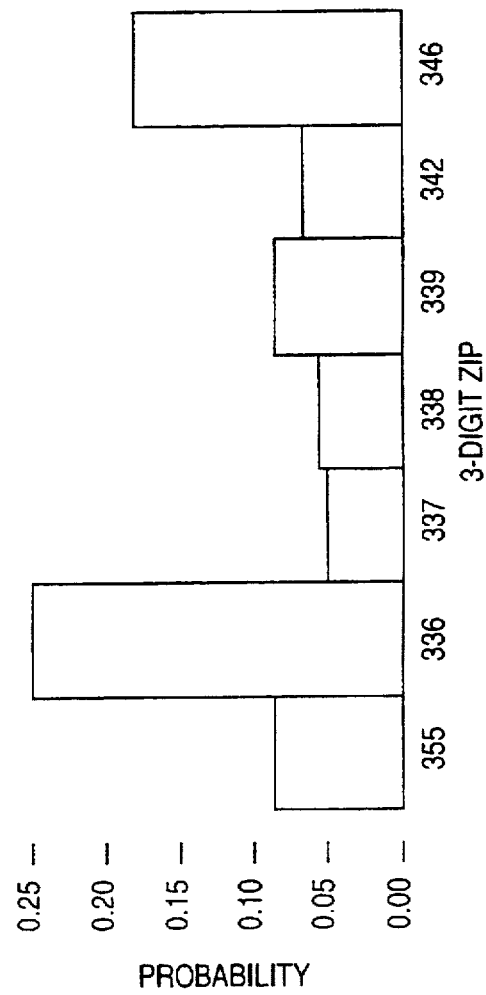
FIG. 12 is a histogram of the most popular 3-digit zip codes at the Florida General Mail Facility.
Figure 10:
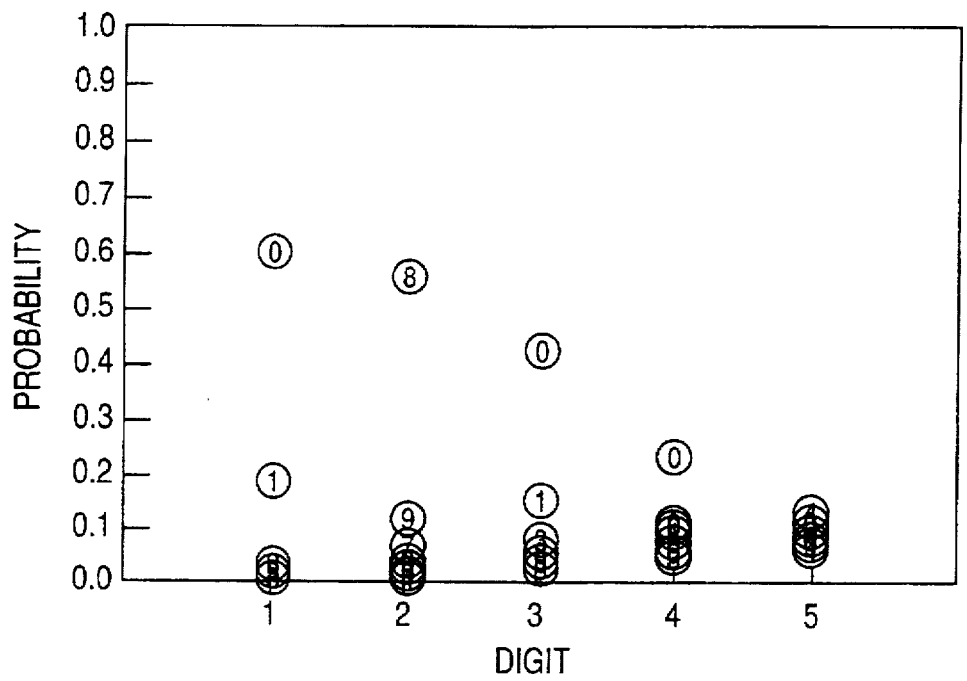
FIGS. 10 and 11 are graphs with the digit positions of the five digits of the zip codes sequentially positioned along the abscissa and probability along the ordinate, of the unconditional probability of each of the numbers 0–9 being in a particular digit position in the various zip codes of the images analyzed in the New Jersey General Mail Facility for handwritten and machine created mail pieces, respectively. The graphs are based on 7,662 images with 511 being unresolvable in case of FIG. 10 and 4,018 images with 309 being unresolvable in the case of FIG. 11.
Figure 11:
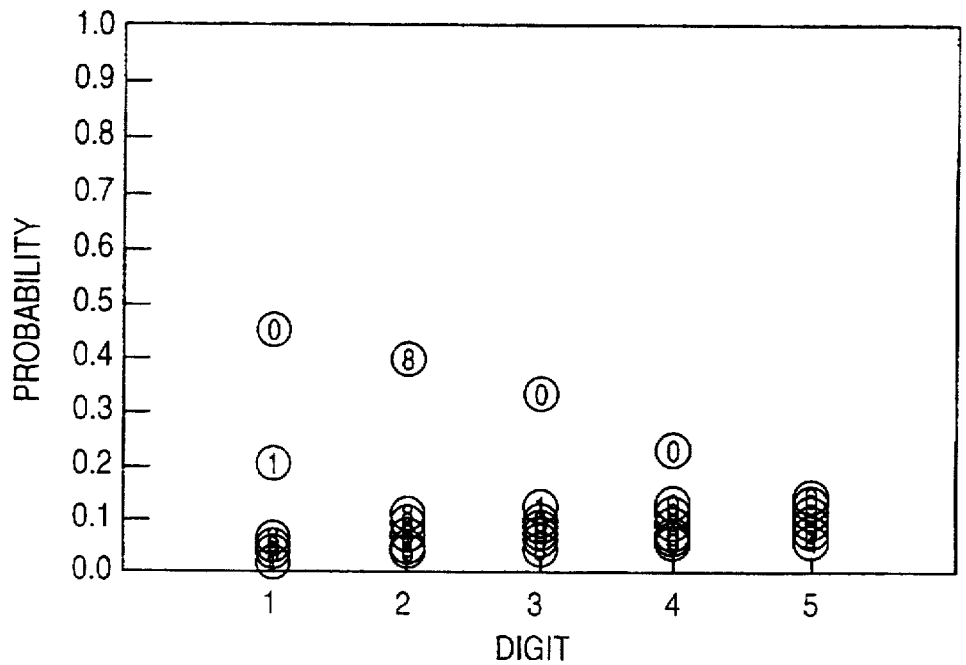

The New Jersey GMF mail stream exhibited analogous characteristics to the Florida GMF mail stream, although the leading digit had two dominant values instead of one. From FIGS. 10 and 11, it is clear that there are only a few combinations of the first three digits, to be referred to as 3-digit, that occur regularly. FIG. 12 shows a histogram of the most popular 3-digit zip codes at the Florida GMF.

Figure 13:
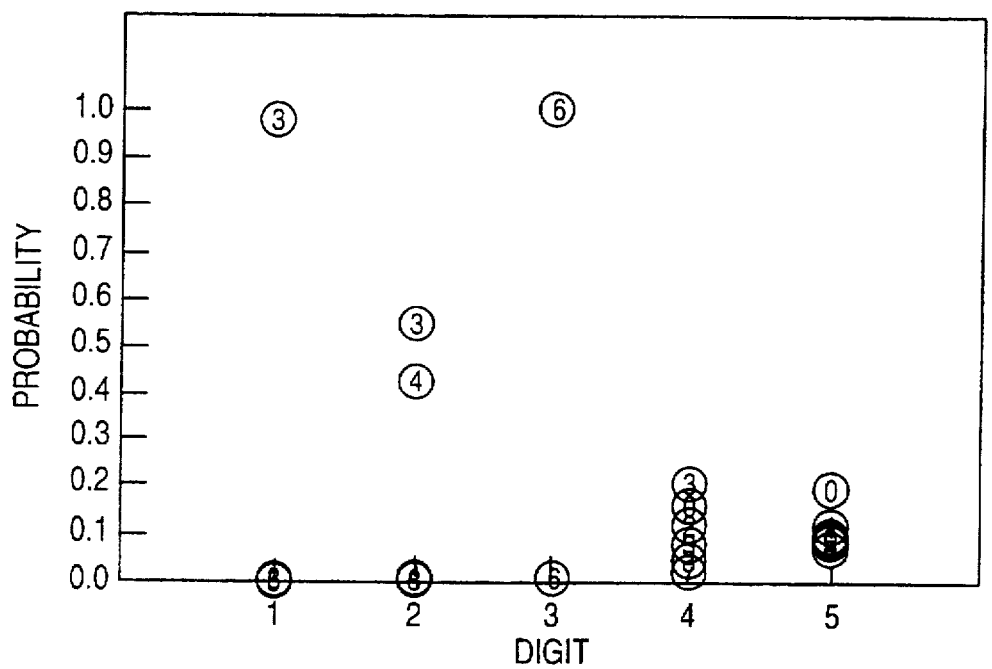
FIG. 13 is a graph of the conditional probability of each of the numbers 0–9 being in a particular digit position in the zip code given that 3rd digit of the zip code is a "6". The digit positions of the five digits of the zip codes sequentially positioned along the abscissa and with probabilities along the ordinate.

To obtain numbers for the last two digits of the zip with a higher occurrence probability, the conditional probability of the last two digits can be calculated given one of the first three digits. Shown in FIG. 13 is the conditional probability of a number occurring given that the third digit of the zip is a '6'. Notice that the probability of the '3' and '0' do increase here for the fourth and fifth digits respectively. However, even though these probabilities have increased, the choice of a dominant character for the last two digits is still not clear. This ambiguity will limit the assumptions that can be made about the last two digits.

Figure 14:
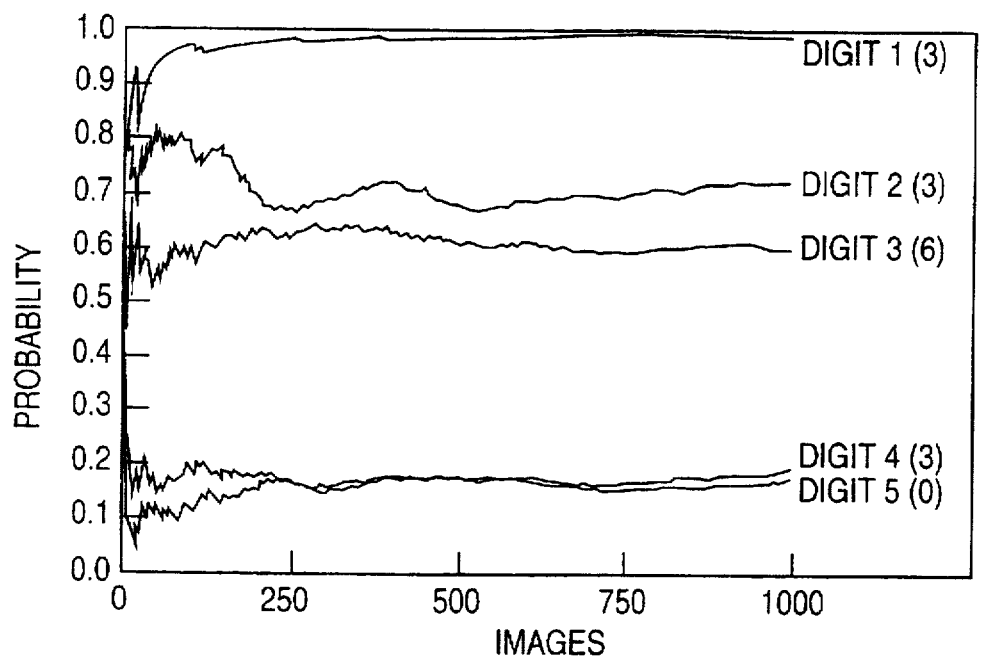
FIG. 14 is a graph of the convergence of statistical parameters for the probability of a particular digit occurring the different positions in the 5 digit zip code for mail pieces in the Florida General Mail Facility. The number of images processed are shown along the abscissa and the probability is shown along the ordinate.

Finally, since it may be beneficial to gather and process these statistics on a continuous basis and/or during real-time operations, the convergence of these statistics was analyzed. As shown in FIG. 14 the convergence occurs rather quickly and is not expected to be a limiting factor, even in real-time operations.

The ability to exploit the statistical characteristics during operations is highly likely, given the rapid convergence of the statistics.

After characterizing the statistical properties, the highly skewed statistical distributions of several mail stream parameters can be exploited using a method which will be referred to as the Adaptive Address Interpretation Process (AAIP). The AAIP is capable of overcoming two problems that caused the RCR address interpretation process to either assign an incorrect zip or not assign a zip at all. The first problem occurs when a word break is not present at the start and end of the zip, or a word break has been placed in the middle of a zip. The second problem occurs when one or more of the correct digits of the zip are ranked as the second or third choice.

These two problems are due to the dependency of conventional process on word breaks, character ranking and character confidences. The AAIP, however, effectively searches for a sequence of most-probable characters, which makes it more robust than the conventional scheme. More specifically, the AAIP searches the last line of the address block for the most popular three-digit zip codes. A list is made of all of the popular three-digit zips that are found. Note that the characters used to make up the three-digit zips are chosen regardless of character ranking, word breaks, and character confidence. The candidates are then ranked based on the sum of the character confidence values for the individual characters of the three-digit zip codes. The three-digit zip code with the highest confidence value sum is then assumed to be the correct choice for that image.

Figure 15:
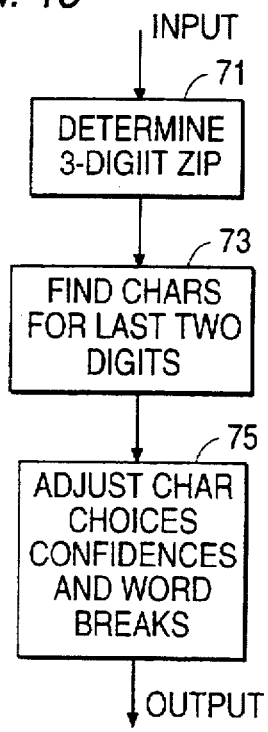
FIG. 15 is a flow diagram for the Adaptive Address Interpretation Process.

The flow diagram for AAIP is shown in FIG. 15. After searching for the most-probable three-digit zip codes in step 71, the AAIP applies conditional statistics to estimate the last two digits in step 73, to find the final two digits of the zip code. A list of comparisons that implicitly use the conditional probability of the last two digits given the first three are used to determine the best choice. The conditions of the comparisons are based on the character confidences as well as the number of occurrences of that zip code. Since the probability of any one given number occurring in one of the last two positions is low, unlike for the first three positions, it is necessary to be very discriminating when choosing a second or third choice based on the probability of that number. To ensure that this restriction is met the third choice is not considered as a possible choice in a preferred embodiment of the invention.

Figure 16:
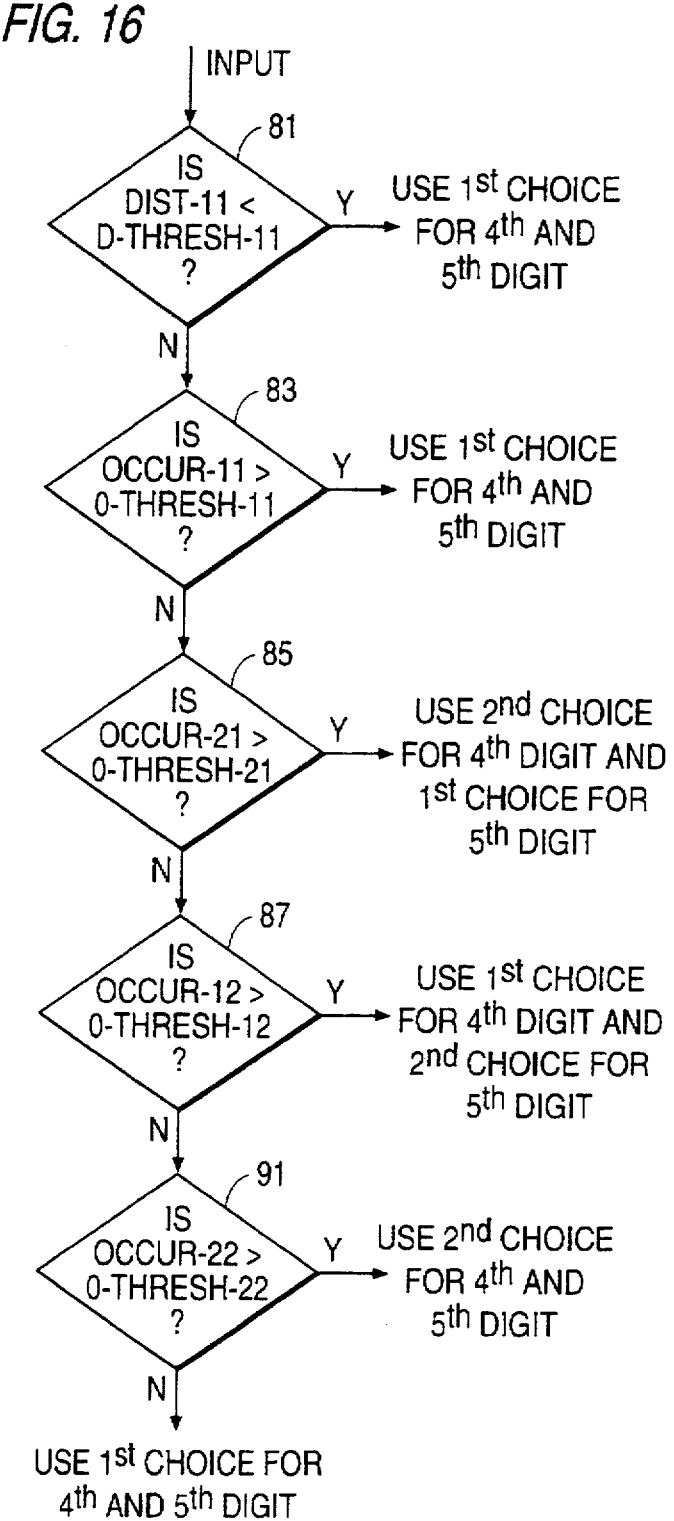
FIG. 16 is a flow diagram showing the decision process used to determine the best choice for the last two digits of the zip code.

The logic used to determine the last two digits from two possible choices for each of the digits of the zip code is shown in FIG. 16. The thresholds that are used in the comparisons are tuned to prevent either character confidence or the occurrence rate from dominating the choice. In the first decision block 81 the confidence value for the first choice for the fourth and fifth characters represented by Dist-11 is compared to a threshold value D-thresh-11. For each normalized character image, the character recognition process produces 9 choices plus their respective confidence values which is a distance measure from the ideal and ranges from 1–255, with 1 being the highest confidence. Therefore, if the confidence in the first choice for the fourth and fifth character is sufficiently high, the first choice for the fourth and fifth digit is used. If the confidence in the fourth and fifth digit is not sufficiently high, then in decision block 83 the number of occurrences for the first choice for the fourth and fifth digit is compared to a threshold value. If the threshold value is exceeded, then the first choice for the fourth and fifth digit is chosen. If the number of occurrences did not exceed the threshold value in decision block 83, then in decision block 85 the number of occurrences for the second choice for the fourth digit and the first choice for the fifth digit is compared to a threshold value. If the threshold value is exceeded, then the second choice for the fourth digit and the first choice for the fifth digit is selected. If the threshold is not exceeded then a comparison is made in decision block 87 between the occurrence of the first choice for the fourth digit and the second choice for the fifth digit to the threshold value for occurrences of the first choice for the fourth digit and the second choice for the fifth digit. If the threshold is exceeded then the first choice for the fourth digit and the second choice for the fifth digit is selected. If the threshold is not exceeded, then the comparison of the occurrence of the second choice for the fourth and fifth digits is made to an occurrence threshold for those digits and if the threshold is exceeded then the second choice for the fourth and fifth digit is made. If the threshold is not exceeded then the first choice for the 4 and 5 digit is made.

Once the final two digits of the zip code have been found, the character ranking, character confidences, and word breaks can be modified to clearly show the zip code. In step 75 of FIG. 15, the adjusted character confidences, word breaks and zip code character choices are output to the address interpretation function in step 41 of FIG. 1 for validation.

Figure 17:
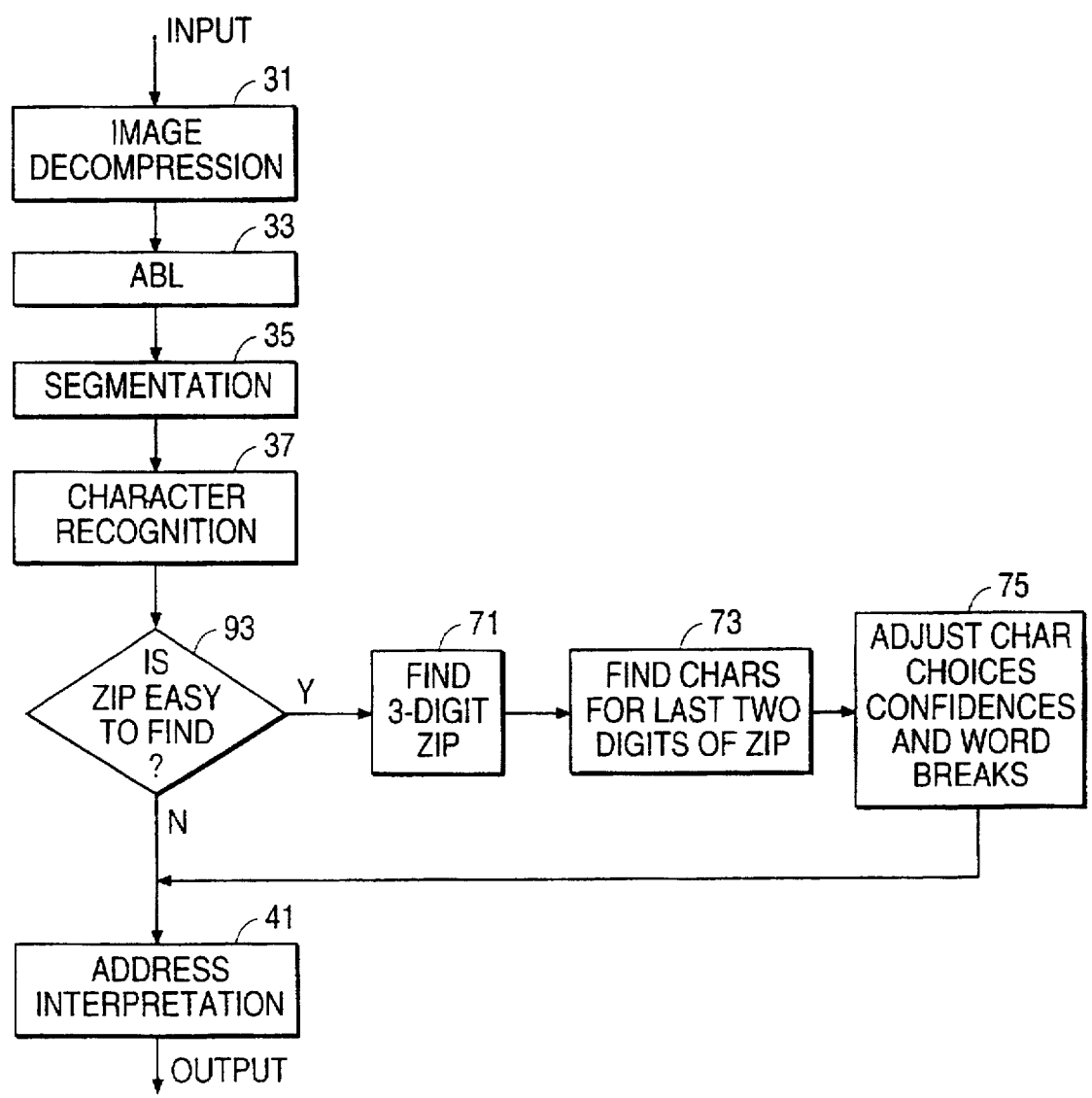
FIG. 17 is a flow diagram of one embodiment of a optical character recognition system in accordance with the present invention.

FIG. 17 shows the flow diagram of one of the ways in which the AAIP can be placed in the present system. There are two major differences between this system and the original (RCR) system that need explanation. First, the AAIP has not replaced the RCR Address Interpretation Process (AIP). This is because the AAIP only looks for a 5-digit zip code, while the RCR AIP looks for additional information such as P.O. boxes, zip+4's etc. The AIP also has the ability to check a national directory to ensure that a zip code is valid.

The second difference is the pre-AAIP step, shown in decision block 93, that determines if the zip code is "easy" to find. This step is needed to prevent zip codes that would have been correctly assigned by the original system from being adversely affected by the AAIP. This step is critical to the effectiveness of this process. In order to truly integrate the AAIP into the system the AAIP and the AIP should be done in the same step. This would allow the AAIP to be more fully utilized.

Figure 18:
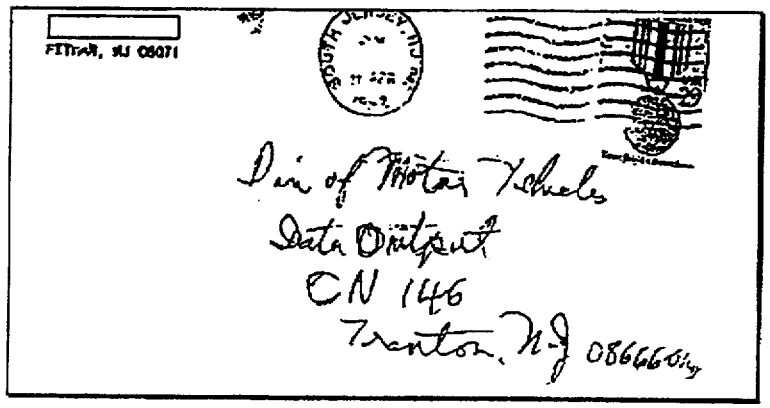
FIGS. 18 and 19 are sample images of a handwritten mail pieces which the present invention was able to search for the most probable three digit zip codes in the image areas and was able to correctly assign the five digit zip code. Segments of the return addresses are not disclosed in order to preserve confidentiality.
Figure 19:
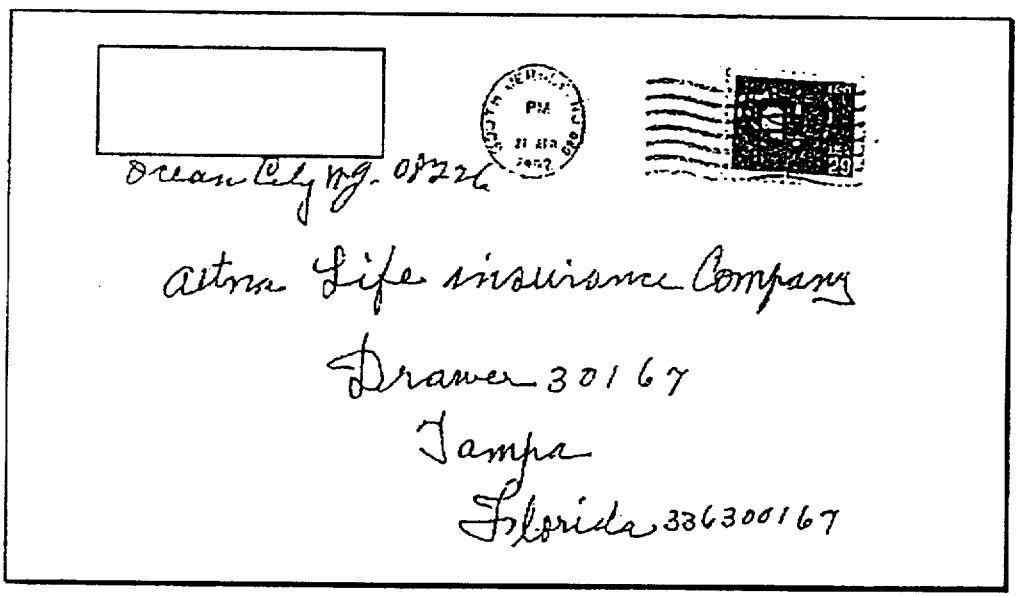

FIG. 18 and 19 show sample handwritten mail pieces that the present invention was able to search for the most probable 3 digit zip code in the image area and was able to correctly assign the five digit zip code.

Another area where an adaptive approach would improve the performance is in the address block location process. The conventional (non-adaptive) address block location process operates by locating text-containing areas in the input envelope image, grouping the text into multi-line candidate address blocks, and ranking the resulting candidates according to measurements such as block width, height, position, number of lines, and aspect ratio. The ranking process uses statistics gathered from a large sample of training images to derive a confidence score for each candidate address block. These statistics compose the static database used by the adaptive ABL process.

Figure 20:
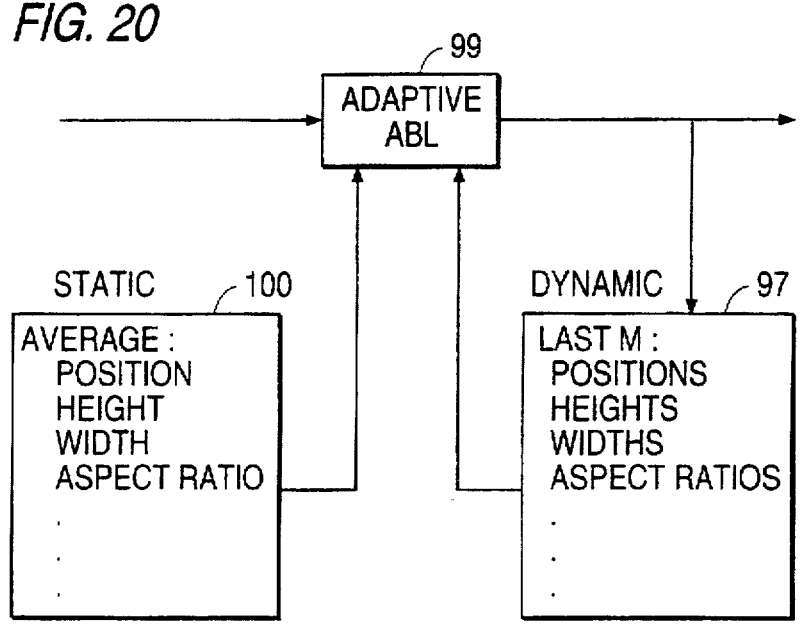
FIG. 20 is block diagram representation of adaptive address block location in accordance with the present invention uses which uses information form the last M images to avoid redundant computation.

Envelope images from large mailings (bills, advertisements, etc.) often generate nearly identical results from the text detection, block grouping, and candidate ranking processes. The adaptive address block location (AABL) process, illustrated in FIG. 20, collects running statistics on the measurements generated by the conventional ABL process in the dynamic database 97 and uses this dynamic information to detect the presence of a large group of identically formatted mail pieces. When a stream of such correlated envelopes is identified, the text detection, block grouping, and ranking steps may be bypassed. A candidate delivery address block location is derived from the running (dynamic) statistics and passed to a process in block 99 that simply refines the block estimate by searching around the boundary of the hypothesized block. This process is highly computationally efficient. The adaptive ABL process uses information from the last M images to avoid redundant computation. If the dynamic information indicates a stream of identically formatted mail pieces, text location, and candidate address block ranking are bypassed and the dynamic information is used to define the location of the delivery address block.

If the address block derived from the dynamic information produces an error or reject in further processing, it is determined that the end of the correlated group of images has been reached and the ABL system reverts to its conventional, more time consuming mode of processing using the average information in the static database 100.

In addition to the uses of the adaptive process mentioned above, an adaptive preprocessing step can be defined that could identify large groups of similar mail pieces. When a large group of similar envelopes is encountered the address block location and other characteristics such as font and pitch will be the same within this group. This information will allow a "selective decompression" to be used where a smaller portion of the image that corresponds to the address block location of the images in this group to be decompressed. This will save a significant amount of time in the decompression step and the steps that follow. Similar assumptions can be made about the font and pitch of the characters in a group of similar images.

Another aspect of the present invention is the grouping of similar images together based on a compressed form of the image. This is done using a one dimensional signature of the compressed image. A simple absolute sum of differences is used to compare the signatures of different compressed images. Images that are similar, or of the same form, will have small differences compared to those that are not of the same form. Using this information, similar images can be grouped together.

The two dimensional compression algorithm is the CCITT Recommendation. The Recommendation is the modified relative element address designate (READ) code (MR code). Two dimensional MR coding compresses a block of k scan lines using a modified Huffman code for the first line. For images used in our analysis, k=4. The following k-1 scan lines are coded to reflect only differences from the pixel patterns of the previous scan line.

The Huffman coding method that is in the recommendation uses a set of predefined codes to represents runs of pixels on a scan line. There are 92 codes that are used in the CCITT recommendation, plus 13 additional codes that are part of an extended table of codes. The codes that represent a scan line are packed into 16-bit words without regard to word boundaries. The end of each scan line is marked by an end-of-line (EOL) code. The EOL code is 000000000001T, where T is a 1 if the following line is a 1D-encoded line and T is 0 if the following line is a 2D-encoded line.

Figure 21:
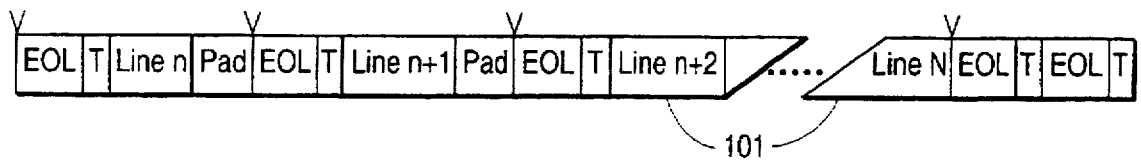
FIG. 21 shows CCITT coding scheme.

The EOL, unlike the other codes, is always on a word boundary. The end of the image is detected by an end-of-page (EOP) code. The EOP code is two consecutive 12-bit EOL codes. The CCITT coding scheme is shown in FIG. 21 with numeral 101 indicating the encoded data format in accordance with the CCITT coding scheme. In FIG. 21, V indicates where data word boundaries are guaranteed, Line x is the run length code stream for a line, EOL is the End-of-Line code word and Pad is the bits added to ensure the EOL is a word boundary, T is the Tag bit used to show whether a line is one dimensionally or two dimensionally compressed.

The number of bytes needed to compress each line will depend on the number of runs of pixels of the same color (black or white). In other words, a line that is completely white or black will compress better than a line that contains text or some kind of graphics.

The signature that is used in the grouping of the images is a measure of the amount of information that is on each scan line. Each point of the signature is the number of bytes between EOL codes. The length of the signature must be equal to the number of scan lines in the image. Since the EOL codes are guaranteed to be on word breaks, they can be located simply by examining each word for an EOL code. If the EOL codes were not on word boundaries it would be very difficult to find them in a reasonable amount of time since it would be necessary to look for an EOL code at each bit. Once the signature is calculated, the grouping of similar image signatures can take place. This is accomplished by adding the absolute value of the difference of each signature point. Similar images should have relatively small differences compared to other images. In most cases the difference between similar images and other images will be an order of magnitude. This is sufficient to group most images using a predetermined threshold.

There will be differences between images of the same group due to differences in the destination address, placement of the cancellation mark over the stamp and shifts in the image position when scanned. These differences can cause problems grouping. The result of these differences is multiple groups that have images of the same form in them.

Figure 22:
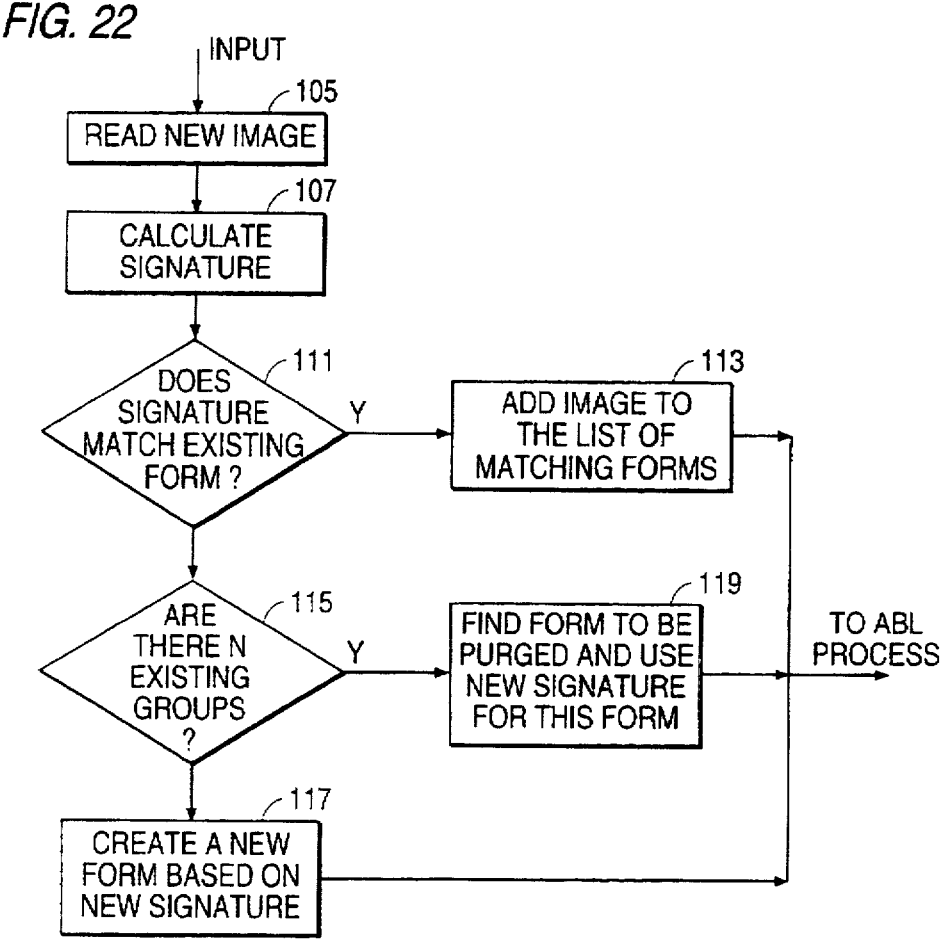
FIG. 22 Flow diagram of grouping process.

There are three properties that were thought to be necessary for a grouping algorithm. First, there should be a finite number of groups. Second, a single group will have a finite life in which images can be added to that group. Thus, a group must die when new images of this form are not found. Third, each new image that does not match an existing group should have the possibility to grow a into a new group. A flow diagram of a grouping process is shown in FIG. 22.

In this process there are N=15 possible groups. Included in the groups can be single images that have not yet matched. For each image that is processed, the image is first read in block 105 and the 1-D signature is calculated from the compressed image in block 107. This signature is compared with the existing groups in decision block 111. If a match is found, that image is added to a list of matching images for that group in block 113 and the number of matching images in that group is increased by one. If no match is found, and there are not already N existing groups as determined in decision block 115, a new group is made in block 117. The signature of the newest image is used, to describe this group. The case in which N groups do not exist will only occur at initialization unless N is large. In the more likely case that all of the groups have signatures associated with them, one of the existing groups has to be purged as shown in block 119 and the new image signature will replace the old.

The form that will be purged is the one that has the fewest number of matching images, that has not received a new entry in the last X=10 images, where X<N. The delay of X images allows a new form the chance to grow the list of matching images. The restriction of X<N will ensure that there is always a group that can be purged in the case when N consecutive images have different signatures. It is not recommended that X be very close to N since this will restrict a group from surviving a run of N images that do not match an existing form.

Numerous techniques have been proposed and demonstrated for performing recognition of cursive written words against the contents of a limited lexicon of candidate word choices. The performance of these methods, both in terms of recognition accuracy and searching speed, is strongly dependent upon the size of the lexicon used. These methods are, thus, particularly well-suited for use in the mail sorting environment where the vocabulary is limited to those words used to compose a delivery address.

A method for using adaptive, statistical methods to maintain static and dynamic lexicons for use in conjunction with word recognition techniques is described which will allow cursive word recognition technology to be employed in production-level mail sorting systems, such as the USPS Remote Computer Reader system, where significant constraints on allowable processing time exist.

Figure 23:
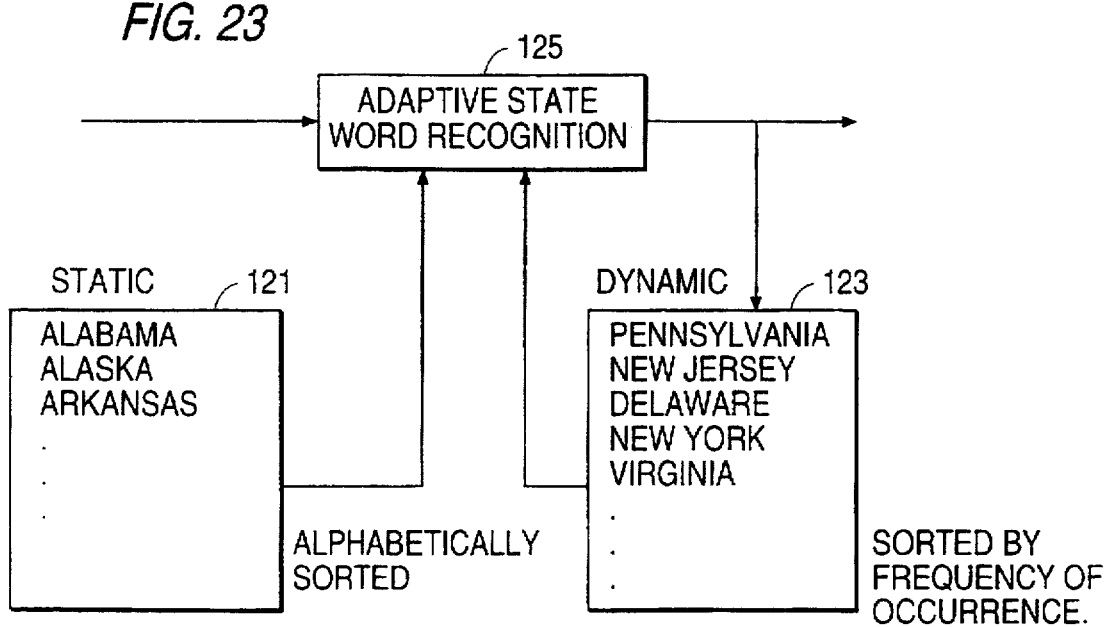
FIG. 23 is a block diagram representation of adaptive dictionary generation for state names.

FIG. 23 illustrates the application of the adaptive technique to candidate word dictionary management. The adaptive process is used to define the order of search of the "state word" dictionary. The most frequently occurring state names will be matched against the input data first. The example given is for the recognition of state words in the last line of an address block, but is equally applicable to other word types such as city names and street names. Multiple dictionaries or data bases are needed in order to properly interpret an address block. With the position of the words in the address block helping to determine which dictionary to use.

Correlations in the words used in addresses is primarily a function of the geographic location of the mail processing center, with inbound (local) mail exhibiting strong correlations for city and state names and less pronounced, but still significant, correlations in street names. The adaptive dictionary management process starts with a relatively large (on the order of thousands of words), static database 121 containing the most frequently observed words of a particular type, for example state, city, street, derived from training data. In the state word example, the vocabulary is small enough that the static database 121 can contain all possible state words and abbreviations. Frequency of occurrence information for each word in the static database is computed on a continuing basis from run-time system observations. The dynamic portion of the dictionary management system 123 uses these continuously updated statistics to define the order of search used by the word recognition engine. Thus the words that are most likely to occur in the data stream are searched first. Search cut-off points are defined according to time constraints and returned word matching confidence values as determined by the adaptive state word recognition block 125. Using the adaptive process, a large percentage of the mail stream can be recognized without having to search through large dictionaries. Increasing the speed of cursive word recognition is critical since there are many more words in the dictionary than there are different letters.

Due to the long evaluation times associated with cursive word recognition it is important to recognized early in the process those mail piece images where cursive word recognition is not likely to be successful. After the address block location has been determined and the print style of the mail piece address has been identified as having hand written cursive address words in the segmentation process 35 of FIG. 24, the zip code is located and recognized using character based recognition techniques. The last line of the address block is then searched first. If the zip code is not found due to an additional line of text such as "Attention of:" or other information not part of the address, the next to the last line of text is examined. City and state words are then located and recognized using well known dictionary based cursive word recognition techniques. The cursive address recognition is only continued if correlation between city and state words and the zip code exceeds a predetermined number, and confidence levels of each of the words and numbers also exceeds a predetermined number. Thresholds are set based on a balance between assignment rate and error rate. At the present an error rate of less than 4% is considered desirable. If sufficiently high confidence levels and correlation levels do not exist, obtaining information on the street address and street numbers will not be meaningful for use in checking and assigning 9 and 11 digit zip codes and the attempted recognition of the street address line will not be productive.

Figure 24:
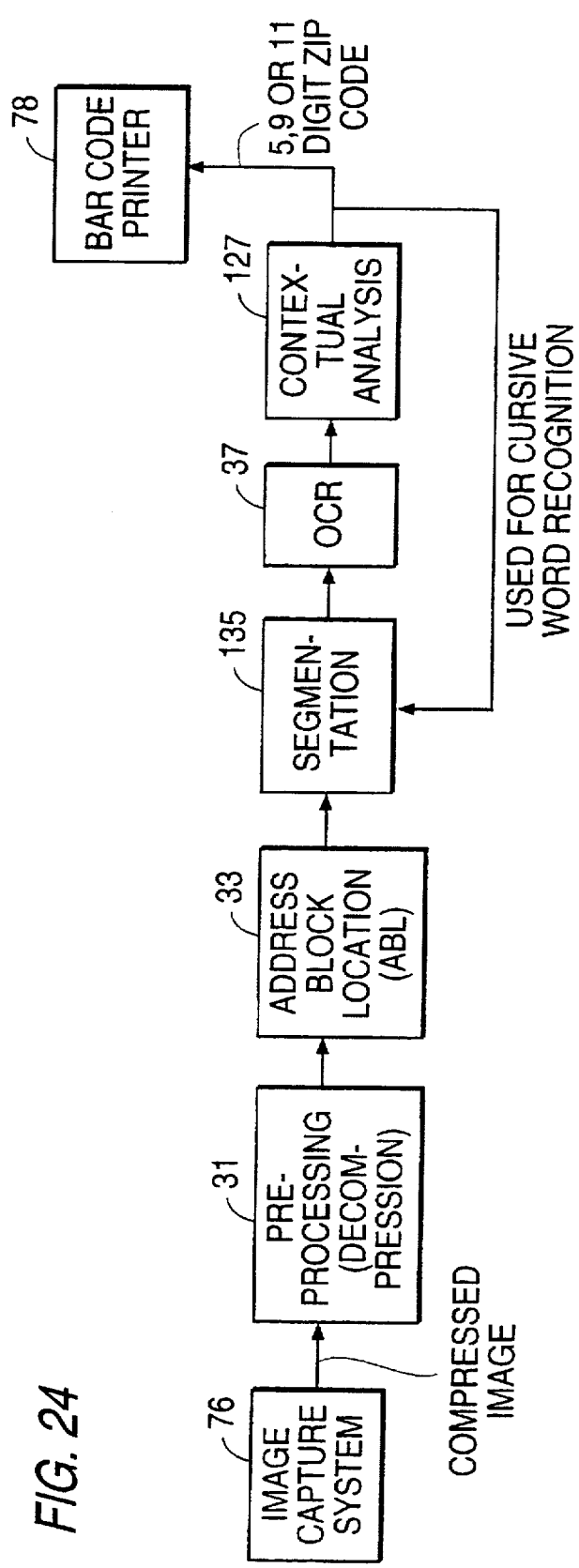
FIG. 24 is an intelligent character recognition flow diagram.

The flow diagram of FIG. 24 shows the intelligent character recognition flow diagram with the process of FIG. 23 forming part of the contextual analysis block 127 of FIG. 24. In the process of recognizing a cursive words a variety of segmentations are examined in an iterative fashion, including word breaks and letter breaks, until an acceptable confidence level based on dictionary matches is reached. Confirmation of the numeric zip code with the city and state for 5 digit zip codes and with street name and numbers for 9 and 11 digit zip codes is obtained from the national data base address directory which has state, city, and street and street number ranges. If the zip code is confirmed the mail piece associated with the evaluated image is bar coded with the identified zip code in block 78.

While the invention has been particularly shown and described with reference to several embodiments thereof, it will be understood by the those skilled in the art that various changes in form and details may be made therein without departing from the spirit and scope of the invention.

We claim:

1. A method of cursive address recognition of mail pieces using adaptive database management, comprising the steps of:

creating word databases containing the most frequently observed words in particular portions of an address block derived from training data;

extracting word images from various portions of the address block;

comparing the word images to the database corresponding to the appropriate portion of the address block using a cursive word recognition engine; and updating the search order of the word databases based on the frequency of occurrence of recognized words.

2. The method of claim 1 wherein said step of updating includes basing search order only on a predetermined number of the most recently evaluated addresses.

3. The method of claim 1 wherein the step of updating is based on the confidence of entire address assignment exceeding a predetermined threshold.

4. The method of claim 2 wherein the step of updating is based on the confidence of entire address assignment exceeding a predetermined threshold.

5. A method of cursive address recognition of mail pieces using adaptive database management, comprising the steps of:

creating word databases containing the most frequently observed words in particular portions of an address block derived from mail pieces;

extracting word images from various portions of the address block;

comparing the word images to the database corresponding to the appropriate portion of the address block using a cursive word recognition engine; and updating the search order of the word databases based on the frequency of occurrence of recognized words.

6. The method of claim 5 wherein said step of updating includes basing search order only on a predetermined number of the most recently evaluated addresses.

7. The method of claim 5 wherein the step of updating is based on the confidence of entire address assignment exceeding a predetermined threshold.

8. The method of claim 6 wherein the step of updating is based on the confidence of entire address assignment exceeding a predetermined threshold.

* * * * *